C. P. LITTLEPAGE, T. J. HUBBARD & W. A. GREENLY.
Baling-Presses.
No. 154,692. Patented Sept. 1, 1874.
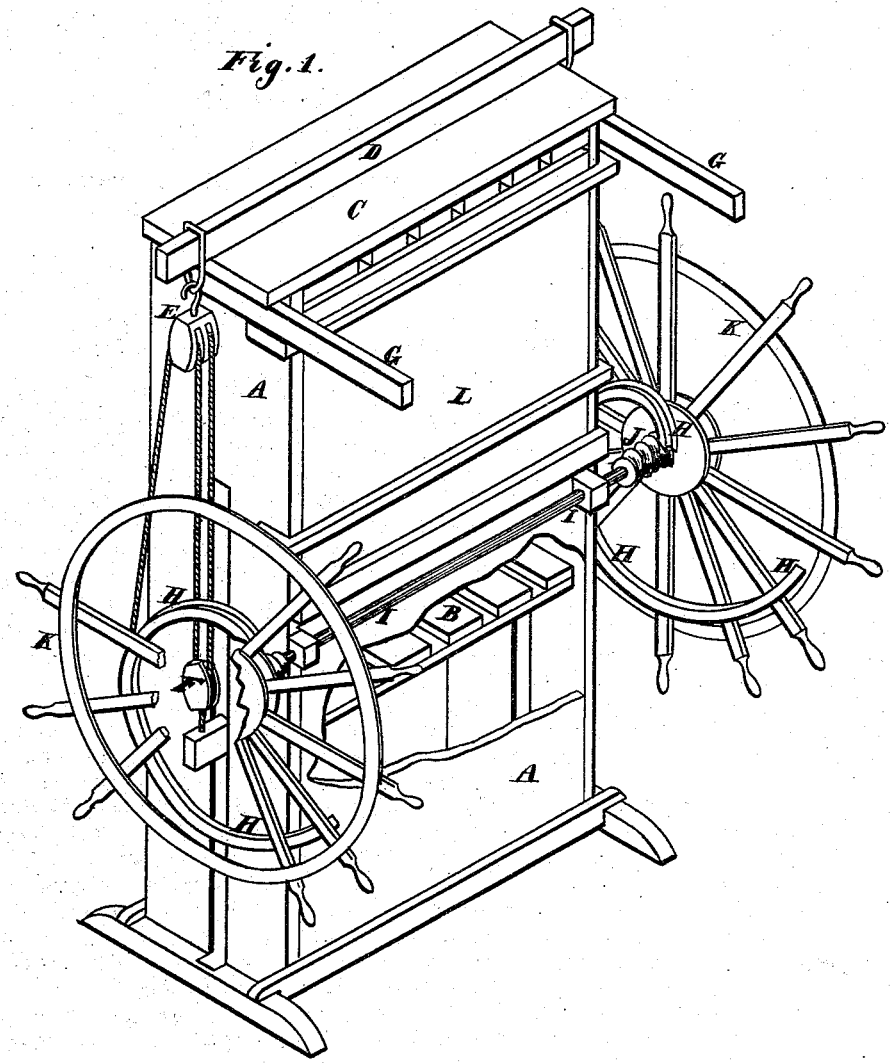

UNITED STATES PATENT OFFICE.

CHARLES P. LITTLEPAGE, OF SAN FRANCISCO, AND THOMAS J. HUBBARD AND WILLIAM A. GREENLY, OF BIG PINE, CALIFORNIA.

IMPROVEMENT IN BALING-PRESSES.

Specification forming part of Letters Patent No. 154,692, dated September 1, 1874; application filed May 2, 1874.

*To all whom it may concern:*

Be it known that we, CHARLES P. LITTLEPAGE, of San Francisco, California, and THOMAS J. HUBBARD and WILLIAM A. GREENLY, of Big Pine, Inyo county, State of California, have invented an Improved Baling-Press; and we do hereby declare the following description and accompanying drawings are sufficient to enable any person skilled in the art or science to which it most nearly appertains to make and use our said invention or improvement without further invention or experiment.

Our invention relates to certain improvements in baling-presses; and it consists in the use of a pair of large hand or steering wheels provided with peculiarly-shaped cams, which take up the rope or chain very rapidly at first, and run off into cone-shaped spirally-grooved hubs on the axle as the bale is finished. With these cams we employ certain blocks of pulleys, which serve to draw up the follower, and at the same time to hold the door or cover at the top by the manner in which they are connected.

Referring to the accompanying drawings, Figure 1 is a perspective view of our press.

A is the box or body of a baling-press, provided with a follower, B, which is made to move up from the bottom, so as to press the material between itself and the cover C. This cover C is strongly made, and the bar or timber D across its top extends a short distance beyond the ends of the cover, and to the ends of this box the pulley-blocks E are made fast. Other blocks F are secured to the ends of the follower, and when power is applied to the rope or chain, which passes around these pulleys, it will be seen that the follower will be drawn up, while the same force serves to hold the cover C firmly to its place without any other fastening of any kind, which is a very great convenience and economy of time. In order to open the top of the press for the purpose of filling it with the material to be pressed, two timbers, G, project at the top, as shown, and as soon as the pulley-ropes are slackened by letting down the follower the top or cover C can be moved back upon these guides without removing or unfastening anything.

When the press is filled and closed, it will be manifest that a comparatively small power and considerable speed in the movement of the follower will be sufficient for the first part of the pressing, and it will not be until the bale is nearly compressed that great power and slow motion will be needed. In order therefore to obtain this variable speed and power, the rope from the pulleys is attached to the outer end of the grooved cam H, which commences with a wide sweep, so that the rope will be taken up very rapidly by the first turn of the cam. The cam sweeps inward to the center or axle I, upon which it is mounted, and the rope passes from the cam onto the decreasing cone J, so that as the bale becomes closely compressed a greater power begins to be exerted. In order to exert the necessary power in the best manner, the cams H are mounted upon the sides of two wheels, K K, secured to the ends of the axle I, and which are made like the steering-wheels of ships, with projecting arms or spokes, which serve as handles by which to turn them.

The discharge-door L is secured by suitable clamps (not shown) until it is necessary to take out the bale.

Having thus described our invention, what we claim, and desire to secure by Letters Patent, is—

The wheels K, carrying the cams H, cone-shaped spirally-grooved hubs J, and axle I, in combination with the cords and pulleys E F, as specified.

In witness we hereunto set our hands and seals.

CHARLES P. LITTLEPAGE. [L. S.]
THOMAS J. HUBBARD. [L. S.]
WILLIAM A. GREENLY. [L. S.]

Witnesses:
THOS. MAY,
PAUL W. BENNETT.